United States Patent [19]

Hopperdietzel

[11] Patent Number: 5,116,087
[45] Date of Patent: May 26, 1992

[54] PIPE WHICH IS CONFIGURED FOR COUPLING TO ANOTHER PIPE

[75] Inventor: Siegfried Hopperdietzel, Selb, Fed. Rep. of Germany

[73] Assignee: Rehau Ag & Co., Rehau, Fed. Rep. of Germany

[21] Appl. No.: 570,424

[22] Filed: Aug. 21, 1990

[30] Foreign Application Priority Data

Aug. 30, 1989 [DE] Fed. Rep. of Germany ....... 3928700

[51] Int. Cl.$^5$ .............................................. F16L 13/02
[52] U.S. Cl. ..................................... 285/286; 285/399; 285/423; 285/915
[58] Field of Search ............... 285/399, 374, 328, 424, 285/286, 915, 423

[56] References Cited

U.S. PATENT DOCUMENTS

| | | | |
|---|---|---|---|
| 695,066 | 3/1902 | MacClain et al. | 285/399 X |
| 749,338 | 1/1904 | Taylor | 285/399 X |
| 1,011,353 | 12/1911 | Parry | 285/399 X |
| 1,824,838 | 9/1931 | Root | 285/399 |
| 2,337,584 | 12/1943 | Baker | 285/399 X |
| 2,785,910 | 3/1957 | Munger | 285/423 X |
| 4,161,273 | 7/1979 | Jeffers | 285/399 X |

FOREIGN PATENT DOCUMENTS

| | | | |
|---|---|---|---|
| 739854 | 8/1966 | Canada | 285/399 |
| 21051 | 2/1883 | Fed. Rep. of Germany | |
| 2102163 | 2/1974 | Fed. Rep. of Germany | |
| 8001815 | 1/1980 | Fed. Rep. of Germany | |
| 250100 | 4/1926 | United Kingdom | 285/399 |

Primary Examiner—Dave W. Arola
Attorney, Agent, or Firm—Spencer, Frank & Schneider

[57] ABSTRACT

A pipe which is configured for coupling to another conduit such as a following pipe has an end portion of reduced outer diameter and a transition portion which is connected to the body of the pipe. The end portion can be inserted into the following pipe. At least one abutment is provided at the transition portion to provide a contact face for receiving the end face of the following pipe.

16 Claims, 3 Drawing Sheets

PIPE WHICH IS CONFIGURED FOR COUPLING TO ANOTHER PIPE

BACKGROUND OF THE INVENTION

The invention relates to a pipe which is made of plastic, metal, or the like and which has an end portion that plugs into the end of another conduit (i.e., a second pipe) to provide a male/female coupling between the pipe and the conduit. More particularly, the invention relates to a pipe having an end portion with a reduced outer diameter and having a transition portion to the end portion.

German Laid-Open Application number 2,102,163 discloses a method of producing plastic pipes which are drawn-in at one pointed end. The drawn-in end is pushed into the interior of the next-following pipe. The prior art pipes are used, for example, as gutter downspouts. The prior art method produces the pipe in a first process step and, in a second process step, the pipe is widened in a calibrator and then cooled. Thereafter, in a third process step, the free end of a cut-off pipe section is heated to approximately the softening temperature and is pushed in this state over a cooled mandrel. The cooled mandrel has a diameter approximately corresponding to the diameter of the drawing mandrel during manufacture of the pipes. By cooling the pipe end, the latter shrinks onto the cooled mandrel and, in this way, the outer diameter of the drawn-in portion is brought to approximately the circumference of the inner diameter of the widened pipe.

The process of shrinking the pipe end has the result that a conical transition portion forms between the drawn-in plug-in end and the widened pipe.

If the gutter downspouts produced in this manner are pushed together, this conical transition portion abuts against the edge of the free end of the next pipe that has been pushed over the coupling region so that the pipes are held together. This is acceptable for gutter downspouts because only the weight of the coupled pipes is supported by the respective contact regions of successive pipe sections. Such pipe couplings are unable to withstand additional stresses because with increasing force, the pipe end serving as the female member of the coupling tends to bulge out and break, so that the established pipe coupling would be destroyed.

SUMMARY OF THE INVENTION

The object of the invention is to provide a pipe which is configured for connection to another pipe via a coupling that can be pressure stressed to the load limit of the pipe.

According to the invention, this object can be attained by providing an abutment zone, with at least one abutment having a contact face for the end face of the following pipe, at the transition portion between the reduced diameter end portion and the actual pipe diameter (i.e., the diameter of the body portion of the pipe).

Advantageously, the height of an abutment corresponds to the difference between the radius of the body portion the pipe and the radius of the reduced diameter end portion, and the abutment's contact face extends perpendicular to the pipe axis. In a special embodiment, the contact face may also extend at an angle to the pipe axis. In this way, it is possible to increase the pressure resistance of the coupling even further.

The abutment zone may be composed of stops or stop cams which are uniformly distributed around the circumference of the transition portion.

The individual stop cams may be separated from one another by tapered regions of the transition portion. Instead of stop cams, the abutment zone may be an annular, pressed-out wall portion which extends around the circumference of the transition portion. This pressed-out wall portion may be supported by axial supporting webs extending over the transition portion. Finally, the abutment zone may be provided by a conical supporting ring which is tapered in the opposite direction with respect to the transition portion of the pipe and which is disposed in a pressure tight manner on the transition portion.

The pipe according to the invention constitutes an internal plug-in sleeve connection and is particularly useful for pipe conduits which are to be installed in tunnels through the ground. In this case it is necessary for the pipes to have a smooth outer surface to permit them to be pushed or drawn through the tunnel in the ground. Such tunnels can be dug by means of earth augers, pounded tools, or by hydraulic excavation before the pipe conduit is laid.

If a pipe conduit composed of several individual pipes is moved into a tunnel using a drawing process, the conduit must be axially pre-tensioned by means of a cable or a chain so that the individual pipes do not come apart when being drawn into the tunnel due to friction between the pipe surface and the ground. The force of the required axial pretension depends on the diameter of the pipe, on the maximum length of the pipe conduit, and also on the technology by which the tunnel was produced. There results a maximum axial pressure stress which can be exerted on the pipe conduit and which is composed essentially of the bending strength of the individual pipes of the conduit and of its bulging resistance. The bulging resistance, in turn, is essentially a function of the diameter and the wall thickness of the individual pipes.

Tests in practice have shown that, for example, for a pipe having an outer diameter of 110 mm and a wall thickness of 3.2 mm, the pipe coupling must be given a maximum bias of approximately 2 metric tons.

For a standard cable protection pipe made of PVC and having the dimensions of 110×3.2 mm, the maximum permissible short-term pressure stress for the material is about 90N/mm$^2$. With an outer diameter of 110 mm and a wall thickness of 3.2 mm, such a pipe has a cross-sectional area of 1,106 mm$^2$. From this a maximum pressure stress in the axial direction of 99,540N or 9.9 tons can be calculated. Thus, the maximum permissible pressure stress lies at 4.8 times the value of the axial tensioning force to be expected. Accordingly, it easily becomes possible to reduce by one half the surfaces subjected to axial pressures without causing overloads on the material at the pressure-stressed points.

Thus, the configuration of the coupling provided by a pipe according to the invention permits the contact surface to be reduced to about 50% in view of the cam configurations in the plug-in regions. Pressure tests with such a pipe coupling have shown that even if the pressure contact faces are reduced by 50%, the coupling will not fail when excess pressures occur. That is, the two pipes will not be pushed over one another; instead, the pipe conduit will either buckle or axially bulge out. The result is that area stresses produced by axial pressure stresses in the sleeve are also no problem because of the cam-like configuration of the pressure contact faces according to the invention.

The fact that the coupled pipe sections must have their axes centrally fixed is significant for the operation of the invention, so that the pressure transmitting end faces of the pipes have optimum contact and no annoying joint is created on the exterior of the pipe which would impede insertion of the pipe conduit into the ground tunnel. This centering of the pressure stressed pipe ends is taken over by the reduced diameter end portion, whose outer diameter corresponds to the inner diameter of the next following pipe. The end portion serves as an internal sleeve and produces a constriction of the cross sectional area. However a continuous transition from the constriction to the normal inner diameter of the pipes is needed to enable later pipe conduits or cables to be pulled without problems into the installed pipe system. This continuous transition is produced by a chamfer at the reduced diameter end portion, while at the abutment zone this continuous transition is produced by the way the constriction is shaped. Here, care must be taken that the width of the abutment zone does not become too large since the shaping out of the abutment zone in part relinquishes continuity of the transition at the reduced diameter portion of the pipe. This must be considered, in particular, if the abutment zone is composed of individual stop cams.

Thus, there are two contradictory requirements with respect to engineering reality: On one hand, the width of the cams should be as large as possible in order to make the contact faces for engaging the abutting pipe end as large as possible. On the other hand, the width of the cams must not exceed a certain dimension in order not to adversely influence the continuous transition in the interior of the pipe.

In this connection, tests have shown that the width of the cams should correspond to about five times the rated wall thickness of the pipe, and the distance between the individual cams should, in practice, approach the width of the cams.

DESCRIPTION OF THE PREFERRED EMBODIMENTS

Figure 1:
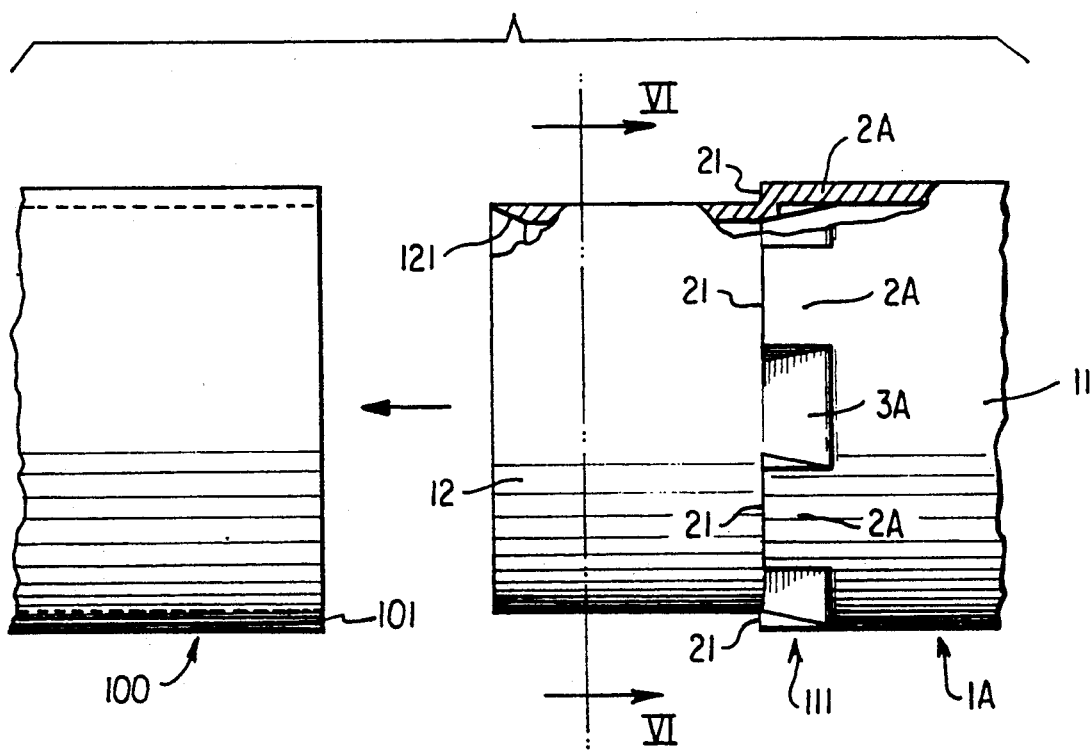
FIG. 1 is a side view, partially in section, showing part of a pipe in accordance with an embodiment of the present invention, along with part of further pipe into which it plugs to provide a male/female coupling between the pipes.

FIG. 1 illustrates a portion of a pipe 1A in accordance with a first embodiment of the present invention. Pipe 1A is configured to be plugged into the end of another conduit such as pipe 100 so as to connect pipes 1A and 100 by way of a male/female coupling, with the pipe 1A providing the male component of the coupling and with pipe 100 providing the female component. Pipe 1A includes a body portion 11 (which extends to the far end of pipe 1A and thus constitutes most of the pipe, although this isn't shown in FIG. 1) having a predetermined outer diameter. Pipe 1A also includes a reduced diameter end portion 12 (a drawn-in region) that terminates in a conical transition region 121, which serves to avoid an abrupt transition between end portion 12 and the interior wall of pipe 100. Pipe 1A is additionally formed to have a transition portion 111 between end portion 12 and body portion 11.

Figure 6:
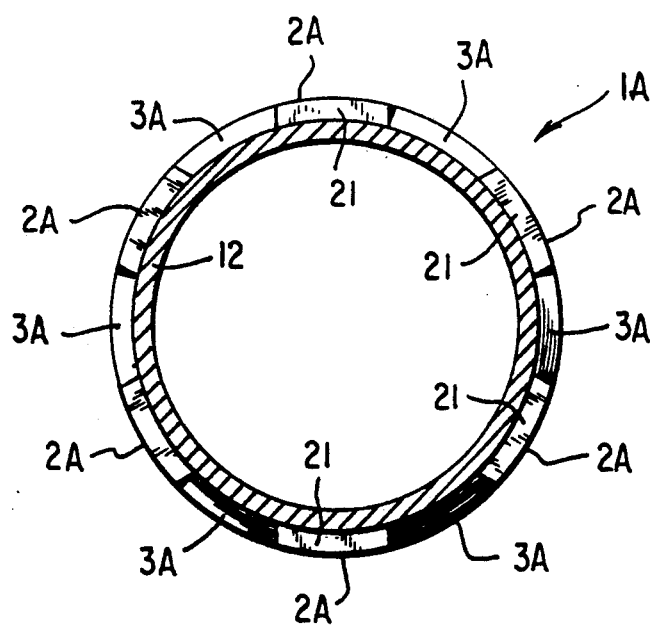
FIG. 6 is a sectional view taken along line VI-VI of FIG. 1.

With reference next to both FIGS. 1 and 6, an abutment zone is composed of stops or stop cams 2A which extend over the entire area of portion 111. During fabrication of pipe 1A, mechanical force is used to press cams 2A out of transition portion 111 which was originally conical or tapered in shape. Accordingly, tapered regions 3A remain between the cams 2A. The regions of the greatest amount of pressing-out lie at the beginning of the end portion 12. These regions of greatest pressing-out provide the contact faces 21 for the end face 101 of pipe 100.

The cams 2A result in the most favorable load transfer for the cross-sectional area of the pipe 100, whose end face 101 lies against cams 2A when pipes 1A and 100 ar coupled by inserting reduced diameter end portion 12 into the end of pipe 100. A direct, straight transition corresponding to the full wall thickness results from the pressure-charged engagement of contact faces 21 with pipe 100. Thus, no damaging buckling, bulging or bending forces are generated.

Figure 2:
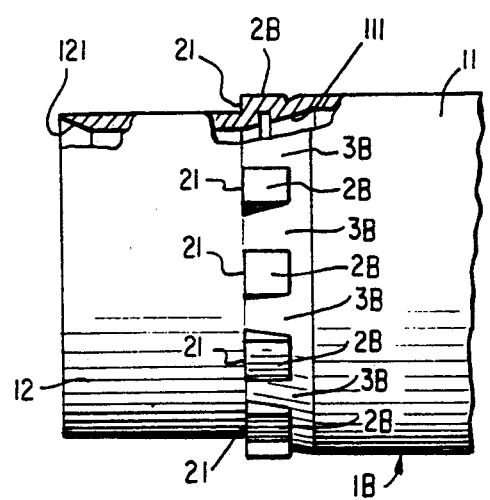
FIG. 2 is a side view, partially in section, showing part of a pipe in accordance with an additional embodiment, the additional embodiment having stop cams which are modified with respect to stop cams shown in FIG. 1.

In the embodiment shown in FIG. 2, the same features are given the same reference numerals. In contrast to the embodiment of FIG. 1, stops or stop cams 2B of pipe 1B do not extend over the entire region of the transition portion 111 but instead are arranged so that tapered regions 3B are not isolated from one another. The shaping out of cams 2B is more favorable in the embodiment of FIG. 2, but the introduction of loads from contact faces 21 by way of cams 2B to the body portion 11 is less favorable since the forces must be redirected through the cam shape into the tapered regions 3B. There are uses for a pipe according to the invention where the capability to resist pressure stresses is not of primary importance, but it is essential that the two connected pipes are centered relative to one another.

Under such conditions, the cam arrangement according to FIG. 2 are sufficient.

Figure 3:
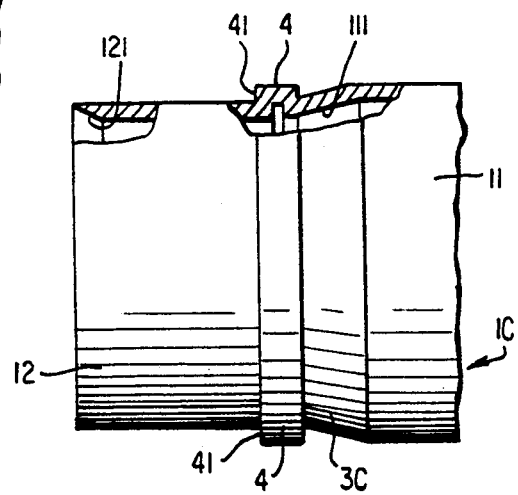
FIG. 3 is a side view, partially in section, of another embodiment which includes a continuous pressure ring formed in front of the tapered transition portion.

The same statements made regarding the cam shape in FIG. 2 also apply for the embodiment according to FIG. 3. The abutment zone and contact face of pipe 1C are not placed into transition portion 111, which is thus left with a single tapered region 3C, but instead are provided by a circumferential pressure ring 4 which lies in front of tapered transition portion 111. The contact face is here given the reference numeral 41.

Figure 4:
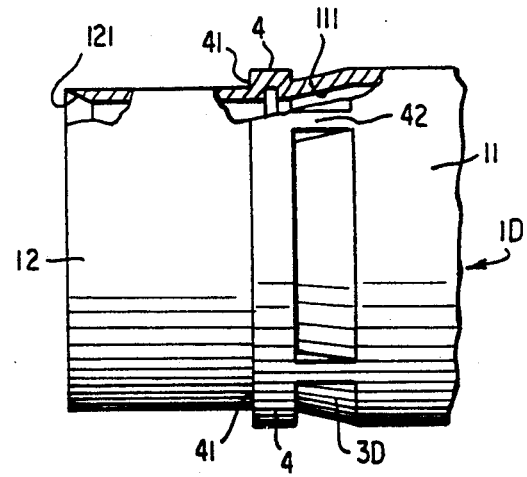
FIG. 4 is a side view, partially in section, showing a modification of the embodiment of FIG. 3, the modified embodiment including axial supporting webs for the pressure ring.

According to the embodiment of FIG. 4, the pressure ring 4 of pipe 1D is supported against body portion 11 by additional supporting webs 42 which extend over the transition portion 111 and separate it into isolated tapered regions 3D.

Figure 5:
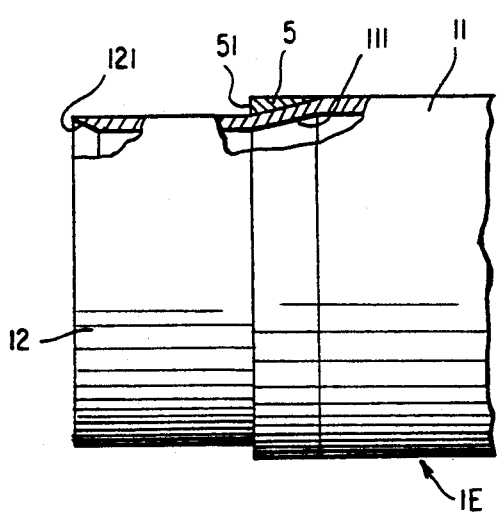
FIG. 5 is a side view, partially in section, of a further embodiment which includes a pressure ring fixed on the tapered transition portion.

In FIG. 5, the shaping of an abutment zone out of or in front of the transition region 111 has been omitted. In pipe 1E, the abutment zone is formed by a supporting ring 5 which is tapered in the opposite direction from transition portion 111. Supporting ring 5 is fastened onto the exterior of the tapered transition portion, for example by gluing, welding, or so forth. Supporting ring 5 provides a contact face 51 for engagement with the end face 101 of pipe 100 (see FIG. 1).

For pipes made of thermoplastic materials, the pipe according to the invention may be produced in the form of an internal plug-in sleeve in an extrusion line. In addition to extrusion, such pipes may also be produced by centrifugal casting. This process is of particular interest in the production of short pipe sections, for example for a relining process.

With regard to pipes produced by extrusion, the constriction at end portion 12 and transition portion 111 may be formed by appropriate sleeve- and socket-making tools within or outside of the line. The protrusions for providing the contact faces may then be produced during the sleeve and socket making process. Another possibility for producing a pipe according to the invention is the blowing process. Here, for example, a continuous bead as shown in FIGS. 3 and 4 is subsequently blown into the drawn-in pipe end. These embodiments may also be produced in a centrifugal casting process.

Figure 7:
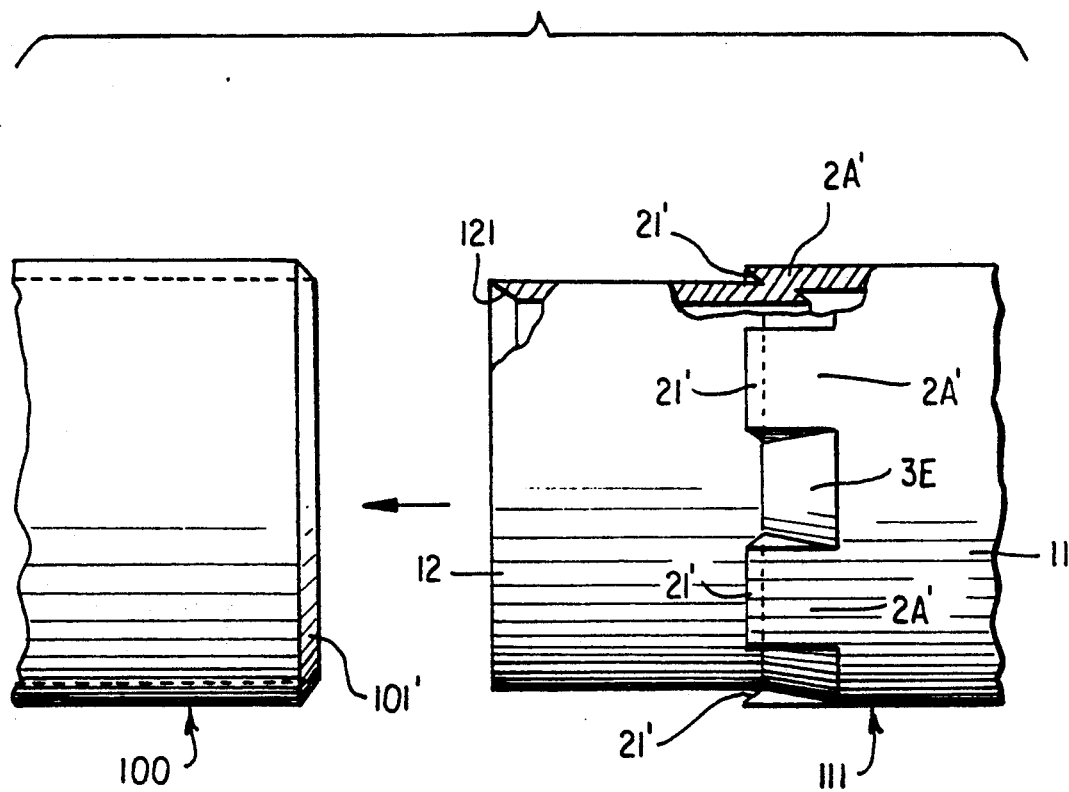
FIG. 7 is a side view, partially in section, showing part of a pipe having stop cams which are modified with respect to the stop came shown in FIG. 1, along with part of a further pipe.

According to the embodiment of FIG. 7, the end face 101' of pipe 100' extends at an angle, and similarly the contact faces 21' extend at an angle to the pipe axis.

Accordingly, tapered regions 3 E remain between the cams 2A'. This permits of the coupling to be increased even further. The cross-section of the embodiment of FIG. 7 is similar to that shown in FIG. 6.

It will be understood that the above description of the present invention is susceptible to various modifications, changes, and adaptations, and the same are intended to be comprehended within the meaning and range of equivalents of the appended claims.

I claim:

1. In a pipe which has a body portion with a predetermined outer diameter, an end portion with an outer diameter that is smaller than the outer diameter of the body portion, and a transition portion between the body portion and the end portion, at least part of the transition portion being tapered, the outer diameter of the end portion of the pipe corresponding approximately to the inner diameter of another conduit having an end into which the end portion of the pipe can be inserted to couple the pipe to the conduit, the end of the conduit having an end face, the improvement comprising:
    abutment means, pressed out of the pipe at the transition portion, for providing a contact face to receive the end face of the conduit, the abutment means including stops which are distributed uniformly about he periphery of the transition portion and which are separated from one another by tapered regions of the transition portion.

2. The improved pipe of claim 1, wherein each stop has a height corresponding to the outer diameter of the body portion of the pipe.

3. The improved pipe of claim 1, wherein the contact face extends perpendicular to the axis of the pipe.

4. The improved pipe of claim 1, wherein each stop has a contact face, the contact faces of the stops extending at an angle to the axis of the pipe.

5. In a pipe which has a pipe wall and which has a body portion with a predetermined outer diameter, an end portion with an outer diameter that is smaller than the outer diameter of the body portion, and a transition portion between the body portion and the end portion, at least part of the transition portion being tapered, the outer diameter of the end portion of the pipe corresponding approximately to the inner diameter of another conduit having an end into which the end portion of the pipe can be inserted to couple the pipe to the conduit, the end of the conduit having an end face, the improvement comprising:
    abutment means, pressed out of the pipe at the transition portion, for providing at contact face to receive the end face of the conduit, the abutment means including an annular pressed-out section of the pipe wall; and
    webs disposed about the transition portion of the pipe to axially support the annular pressed-out section of the pipe wall.

6. In a pipe which has a body portion with a predetermined outer diameter, an end portion with an outer diameter that is smaller than the outer diameter of the body portion, and a transition portion between the body portion and the end portion, the transition portion having taper, the outer diameter of the end portion of the pipe corresponding approximately to the inner diameter of another conduit having an end into which the end portion of the pipe can be inserted to couple the pipe to the conduit, the end of the conduit having an end face, the improvement comprising:
    abutment means for providing a contact face to receive the end face of the conduit, the abutment means including a supporting ring with a taper opposite that of the transition portion, the supporting ring being affixed to the transition portion.

7. The improved pipe of claim 6, wherein the supporting ring is adhesively attached to the transition portion.

8. The improved pipe of claim 6, wherein the supporting ring is welded to the tapered portion.

9. A pipe which is configured for connection to another conduit having an end with an end face, comprising:
    a cylindrical end portion with a predetermined outer diameter that corresponds approximately to the inner diameter of the conduit so that the end portion of the pipe can be inserted into the end of the conduit to couple the pipe to the conduit;
    a body portion with a predetermined outer diameter that is larger than the outer diameter of the end portion, the body portion being spaced apart from the end portion;
    a transition portion between the end portion and the body portion, at least part of the transition portion being tapered; and
    abutment means for providing a contact face which contacts the end face of the conduit so that the end face of the conduit cannot bear directly against the at least a part of the transition portion that is tapered,
    wherein the end portion, body portion, transition portion, and abutment means are made of thermoplastic and are integrally connected together.

10. The pipe of claim 9, wherein the abutment means comprises a plurality of bulges in the transition portion at positions spaced apart from one another to provide stops.

11. The pipe of claim 10, wherein the stops are triangular when viewed from the side.

12. The pipe of claim 9, wherein the abutment means comprises an annular bulge connecting the end portion to the transition portion.

13. The pipe of claim 12, further comprising support webs extending from the annular bulge and into the transition portion, the webs being integrally connected to the annular bulge and the transition portion.

14. A pipe which is configured for connection to another conduit having an end with an end face, comprising:

a cylindrical end portion with a predetermined outer diameter that corresponds approximately to the inner diameter of the conduit so that the end portion of the pipe can be inserted into the end of the conduit to couple the pipe to the conduit;

a body portion with a predetermined outer diameter that is larger than the outer diameter of the end portion, the body portion being spaced apart from the end portion;

a tapered transition portion connecting the end portion to the body portion; and abutment means for providing a contact face which contacts the end face of the conduit so that the end face of the conduit cannot bear directly against the tapered transition portion;

wherein the end portion, body portion, and transition portion are made of thermoplastic and are integrally connected together, and wherein the abutment means includes a supporting ring with a taper opposite that of the transition portion, the supporting ring being affixed to the transition portion.

15. The pipe of claim 14, wherein the supporting ring is adhesively attached to the transition portion.

16. The pipe of claim 14, wherein the supporting ring is welded to the tapered portion.

* * * * *